(12) United States Patent
Sugiyama

(10) Patent No.: US 10,107,958 B2
(45) Date of Patent: Oct. 23, 2018

(54) OPTICAL MODULE AND OPTICAL TRANSMISSION/RECEPTION DEVICE

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/131,389

(22) Filed: Apr. 18, 2016

(65) Prior Publication Data

US 2016/0356955 A1 Dec. 8, 2016

(30) Foreign Application Priority Data

Jun. 5, 2015 (JP) .................. 2015-114984

(51) Int. Cl.
*G02B 6/12* (2006.01)
*G02B 6/42* (2006.01)

(52) U.S. Cl.
CPC ....... *G02B 6/12002* (2013.01); *G02B 6/4281* (2013.01); *G02B 2006/12142* (2013.01)

(58) Field of Classification Search
CPC .............. G02B 6/12002; G02B 6/4281; G02B 2006/12142
See application file for complete search history.

(56) References Cited

U.S. PATENT DOCUMENTS

| | | | | |
|---|---|---|---|---|
| 8,712,195 B2* | 4/2014 | Sugiyama | ............. | G02F 1/0327 333/246 |
| 9,507,108 B2* | 11/2016 | Aoki | ..................... | H05K 1/0204 |
| 9,535,213 B2* | 1/2017 | Sugiyama | ................. | G02B 6/12 |
| 9,588,359 B2* | 3/2017 | Sugiyama | ............. | G02F 1/0121 |
| 2007/0015378 A1* | 1/2007 | Huang | ................... | H05K 1/118 439/67 |
| 2008/0123335 A1* | 5/2008 | Yoo | ..................... | G02F 1/13452 362/257 |

(Continued)

FOREIGN PATENT DOCUMENTS

| JP | 2009-258655 | 11/2009 |
|---|---|---|
| JP | 2010-200234 | 9/2010 |

(Continued)

OTHER PUBLICATIONS

Online blog by Tome what is a flex circuit coverlay publsihed online Mar. 14, 2014.*

(Continued)

*Primary Examiner* — Ryan Lepisto
*Assistant Examiner* — Guy Anderson

(57) ABSTRACT

A flexible substrate includes a first pad that extends from an end of the flexible substrate to a center of the flexible substrate, and at least a part of which is fixed to the first part; a second pad that extends from the end of the flexible substrate to the center at a position adjacent to the first pad, and at least a part of which is fixed to the first part; a signal line that connects a tip of the first pad and the second part and that is narrower in width than the first pad; and a coverlay that covers an area where the signal line is arranged and that includes a protrusion protruding, at a position at which the first pad is arranged, toward the end of the flexible substrate relative to the area where the signal line is arranged.

9 Claims, 6 Drawing Sheets

(56) References Cited

U.S. PATENT DOCUMENTS

| | | | |
|---|---|---|---|
| 2008/0158181 A1* | 7/2008 | Hamblin | G06F 3/0416 345/173 |
| 2009/0237903 A1 | 9/2009 | Onodera | |
| 2010/0215324 A1* | 8/2010 | Ban | G02B 6/4201 385/88 |
| 2011/0151687 A1* | 6/2011 | Mulfinger | H05K 7/1407 439/66 |
| 2011/0269319 A1* | 11/2011 | Cheng | H01R 12/7082 439/67 |
| 2012/0051683 A1* | 3/2012 | Sugiyama | G02F 1/035 385/1 |
| 2012/0082420 A1* | 4/2012 | Aoki | H05K 1/0204 385/88 |
| 2012/0114340 A1* | 5/2012 | Sugiyama | G02B 6/4201 398/200 |
| 2013/0027762 A1* | 1/2013 | Sugiyama | H05K 1/0215 359/245 |
| 2013/0108210 A1* | 5/2013 | Uemura | G02B 6/43 385/14 |
| 2014/0085856 A1* | 3/2014 | Shirao | H05K 1/0251 361/803 |
| 2014/0286614 A1* | 9/2014 | Aoki | H05K 1/0204 385/88 |
| 2015/0062466 A1* | 3/2015 | Yun | G06F 1/1601 349/12 |
| 2015/0147567 A1* | 5/2015 | Simone | H05K 1/0346 428/335 |
| 2015/0261062 A1* | 9/2015 | Sugiyama | G02B 6/12 385/14 |

FOREIGN PATENT DOCUMENTS

| | | |
|---|---|---|
| JP | 2012-105104 | 5/2012 |
| JP | 2013-172128 | 9/2013 |

OTHER PUBLICATIONS

Japanese Office Action dated May 23, 2017 in corresponding Japanese Patent Application No. 2015-114984.

\* cited by examiner

OPTICAL MODULE AND OPTICAL TRANSMISSION/RECEPTION DEVICE

CROSS-REFERENCE TO RELATED APPLICATION

This application is based upon and claims the benefit of priority of the prior Japanese Patent Application No. 2015-114984, filed on Jun. 5, 2015, the entire contents of which are incorporated herein by reference.

FIELD

The embodiment discussed herein is related to an optical module and an optical transmission/reception device.

BACKGROUND

Conventionally, in some cases, a Mach-Zehnder interferometer is used in an optical modulator that modulates light generated by a light source. In such an optical modulator, a signal electrode and a grounding electrode are provided along parallel optical waveguides. In recent years, diversified optical modulation methods are proposed, and an optical modulator is increasingly provided with a plurality of Mach-Zehnder interferometers. In this case, it is possible to reduce the size of the optical modulator by integrating a plurality of the Mach-Zehnder interferometers in a single chip.

An optical modulator including a plurality of the Mach-Zehnder interferometers can generate a multilevel modulation signal when a plurality of different electrical signals are input. That is, it is possible to perform optical modulation using a multilevel modulation method, such as differential quadrature phase shift keying (DQPSK), when different electrical signals are input from outside to signal electrodes corresponding to the respective Mach-Zehnder interferometers.

An input unit for inputting electrical signals to the optical modulator may be provided with a connector. However, if connectors are provided for respective electrical signals, the size of the optical modulator is increased and a mounting area may be increased. Therefore, the size of the device may be reduced by using a flexible printed circuit board (FPC) having the flexibility, as the input unit for the electrical signals.

Specifically, a plurality of wiring patterns corresponding to a plurality of signal electrodes of an optical modulator are printed on the FPC, and electrical signals output from a driver are input to the optical modulator through the wiring patterns printed on the FPC. On an end of the FPC on the driver side, a pad that is a wide electrode is provided, and the pad is soldered to an electrode on a substrate that transmits the electrical signals output from the driver, so that the FPC and the driver are electrically connected. In contrast, on an end of the FPC on the optical modulator side, for example, a lead pin extending from the optical modulator is soldered to the wiring patterns printed on the FPC, so that the FPC and the optical modulator are electrically connected.

Incidentally, as a wiring pattern printed on the FPC, in some cases, a microstripline may be used in order to transmit an electrical signal at a high frequency such as 10 gigahertz (GHz) or higher. Therefore, on the end of the FPC on the driver side, the wide pad and the microstripline narrower than the pad are connected. In addition, in some cases, a coverlay may be provided on the surface of the FPC in order to cover and protect the microstripline.

Patent Literature 1: Japanese Laid-open Patent Publication No. 2009-258655

However, as for the coverlay, the precision of blanking and bonding is low and tolerance is large. Therefore, even if the coverlay is provided on the surface of the FPC, a part of the microstripline may be exposed. That is, due to a large manufacturing error of the coverlay, the microstripline may be exposed particularly in a portion connected to the pad and this may lead to a disconnection or the like.

To cope with this, it may be possible to increase the size of the coverlay to cover even a part of the pad in order to reinforce a portion where the microstripline is provided on the FPC. However, in this case, the coverlay is sandwiched between the pad and the electrode on the substrate, so that soldering between the pad and the electrode on the substrate may be inhibited. Consequently, a part of the pad is covered by the coverlay and is not soldered, so that impedance mismatch occurs in the connected portion of the FPC and the substrate.

Specifically, the pad of the FPC is designed such that the characteristic impedance reaches 50Ω when the entire pad is soldered to the electrode on the substrate. However, if soldering of a part of the pad is inhibited by the coverlay, it becomes difficult to maintain impedance matching. If impedance mismatch occurs, high-frequency reflection is increased in the connected portion of the substrate and the FPC, and a transmission frequency band is reduced.

SUMMARY

According to an aspect of an embodiment, an optical module includes: a first part; a second part; and a flexible substrate that has flexibility and electrically connects the first part and the second part. The flexible substrate includes: a first pad for a signal that extends from an end of the flexible substrate on the first part side to a center of the flexible substrate, and at least a part of which is fixed to the first part; a second pad for grounding that extends from the end of the flexible substrate on the first part side to the center at a position adjacent to the first pad, and at least a part of which is fixed to the first part; a signal line that connects a tip of the first pad and the second part and that is narrower in width than the first pad; and a coverlay that covers an area where the signal line is arranged on the flexible substrate and that includes a protrusion protruding, at a position at which the first pad is arranged, toward the end of the flexible substrate on the first part side relative to the area where the signal line is arranged.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The present invention is not limited by the embodiment below.

Figure 1:
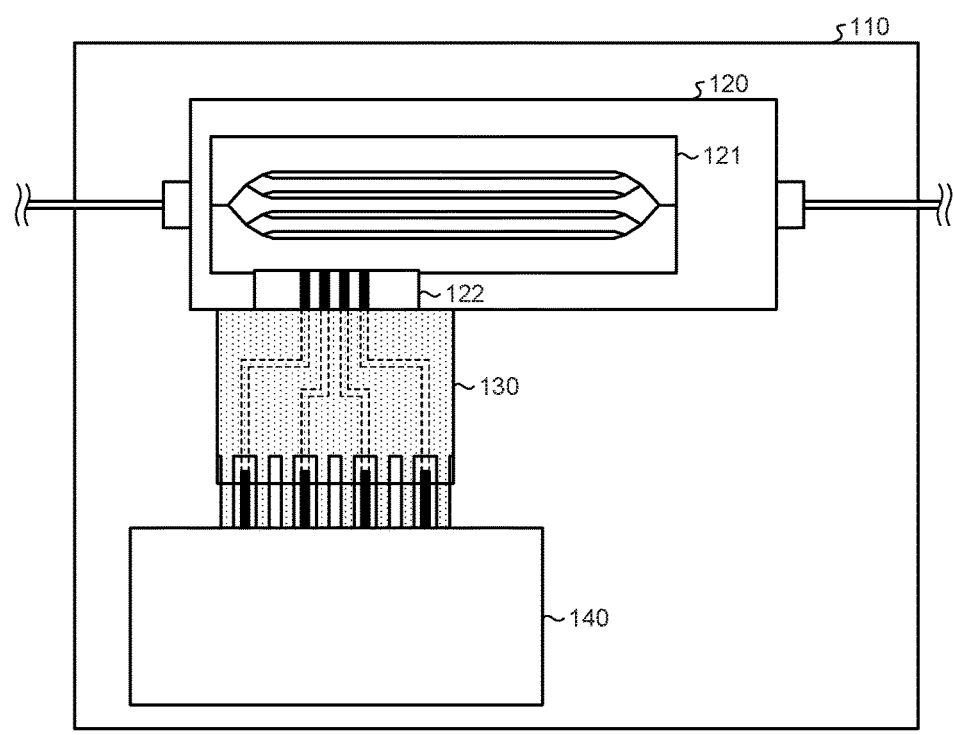
FIG. 1 is a schematic plan view illustrating a configuration of an optical module according to an embodiment.

FIG. 1 is a schematic plan view illustrating a configuration of an optical module according to an embodiment. An optical module illustrated in FIG. 1 includes a printed circuit board (PCB) 110, an optical modulator 120, an FPC 130, and a driver 140.

The PCB 110 is, for example, a glass epoxy substrate or the like, and is a component that serves as a substrate for mounting various components included in an optical module. On a surface of the PCB 110, an electrode for electrically connecting various components is printable.

The optical modulator 120 modulates light generated by a light source (not illustrated) and outputs the light. At this time, the optical modulator 120 performs optical modulation based on an electrical signal output from the driver 140. Specifically, the optical modulator 120 includes a modulator chip 121 and a relay board 122.

The modulator chip 121 includes parallel optical waveguides, signal electrodes, and grounding electrodes, causes light from the light source to propagate by using the optical waveguides, and performs optical modulation based on electrical signals provided to the signal electrode. Specifically, the optical waveguides are formed by forming a metallic film, such as titanium (Ti), on a part of a crystal substrate using an electro-optic crystal, such as lithium niobate ($LiNbO_3$ (LN)) or lithium tantalate ($LiTaO_3$), and then causing thermal diffusion to occur. Furthermore, the optical waveguides may be formed by causing proton exchange to occur in benzoic acid after patterning. In contrast, the signal electrodes and the grounding electrodes are coplanar electrodes provided along the parallel optical waveguides. For example, the signal electrodes and the grounding electrodes are patterned on the respective optical waveguides. Furthermore, a buffer layer is provided between the crystal substrate and each of the signal electrodes and the grounding electrodes to prevent light propagating in the optical waveguides from being absorbed by the signal electrodes and the grounding electrodes. As the buffer layer, for example, silicon dioxide ($SiO_2$) with the thickness of about 0.2 to 2 μm or the like may be used.

The relay board 122 relays an electrical signal output from the driver 140 to the modulator chip 121 and inputs the electrical signal to the signal electrodes of the modulator chip 121. In FIG. 1, the relay board 122 includes four wiring patterns corresponding to four sets of the optical waveguides provided on the modulator chip 121. When electrical signals are input to the signal electrodes provided on the modulator chip 121, and if input units for all of the electrical signals are arrayed on one side of the optical modulator 120, mounting becomes easier and a mounting area can be reduced. Therefore, in the embodiment, the relay board 122 is arranged on the optical modulator 120, and the relay board 122 relays electrical signals input from one side of the optical modulator 120 to the modulator chip 121.

The FPC 130 is a flexible substrate having the flexibility, and provides an electrical signal output from the driver 140 to the optical modulator 120. That is, one end of the FPC 130 is electrically connected to the relay board 122 of the optical modulator 120, and the other end of the FPC 130 is connected to the driver 140 via an electrode on the PCB 110. As illustrated in FIG. 1, pads used for a signal (hereinafter, referred to as "signal pads") and pads used for grounding (hereinafter, referred to as "grounding pads") are provided on the end of the FPC 130 connected to the PCB 110, and a pair of the grounding pads sandwich each of the signal pads.

As will be described later, each of the pads is provided on both sides of the FPC 130 via through holes. Furthermore, the pads provided on a surface of the FPC 130 facing the PCB 110 (that is, a surface on the back side in FIG. 1) are soldered to the electrode on the PCB 110. Moreover, on the surface of the FPC 130 facing the PCB 110, a microstripline for connecting the signal pads and the wiring patterns on the relay board 122 is provided. In contrast, on a surface of the FPC 130 away from the PCB 110 (that is, a front side in FIG. 1), a planar grounding pattern commonly connected to all of the grounding pads is provided. In the following descriptions, the surface of the FPC 130 facing the PCB 110 is referred to as a "signal surface", and the surface away from the PCB 110 is referred to as a "grounding surface". That is, the surface where the microstripline is provided is referred to as the signal surface, and the surface where the grounding pattern is provided is referred to as the grounding surface.

The driver 140 generates a high-frequency electrical signal for modulating light from the light source. Specifically, the driver 140 generates an electrical signal with an amplitude and a phase corresponding to transmission data, and drives the optical modulator 120 by using the electrical signal. The driver 140 is connected to the electrode on the PCB 110.

Figure 2:
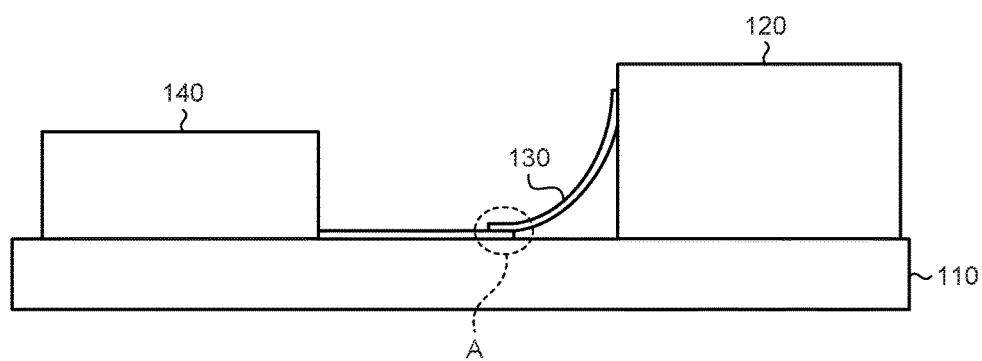
FIG. 2 is a schematic side view illustrating the configuration of the optical module according to the embodiment.
Figure 2:
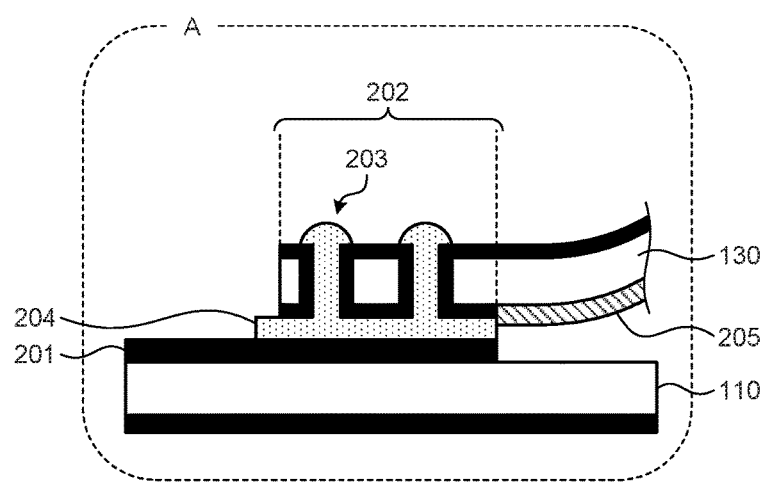

With reference to FIG. 2, a connection between the FPC 130 and the electrode on the PCB 110 will be described below. FIG. 2 is a schematic side view illustrating the configuration of the optical module according to the embodiment.

As illustrated in the upper part of FIG. 2, the optical modulator 120 and the driver 140 are mounted on the PCB 110, and an electrode extending from the driver 140 is printed on the surface of the PCB 110. One end of the FPC 130 is soldered to the electrode, and the other end of the FPC 130 is connected to the optical modulator 120, so that it is possible to transmit an electrical signal output from the driver 140 to the optical modulator 120.

A connected portion A of the electrode printed on the surface of the PCB 110 and the one end of the FPC 130 is illustrated in the lower part of FIG. 2. In the connected portion A, an electrode 201 printed on the surface of the PCB 110 and a pad 202 provided on the end of the FPC 130 are soldered by a solder 204. The pad 202 is a wide electrode arranged on the signal surface and the grounding surface of the FPC 130, and connects the signal surface and the grounding surface by through holes 203. Therefore, the solder 204 used for soldering the electrode 201 and the pad 202 on the signal surface overflows to the grounding surface via the through holes 203.

The pad 202 illustrated in the lower part of FIG. 2 is a grounding pad, and therefore, the grounding pattern is connected to the pad 202 on the grounding surface. In contrast, on the signal surface, the pad 202 is not connected to any electrode and is located adjacent to a coverlay 205 that covers the signal surface of the FPC 130.

Figure 3:
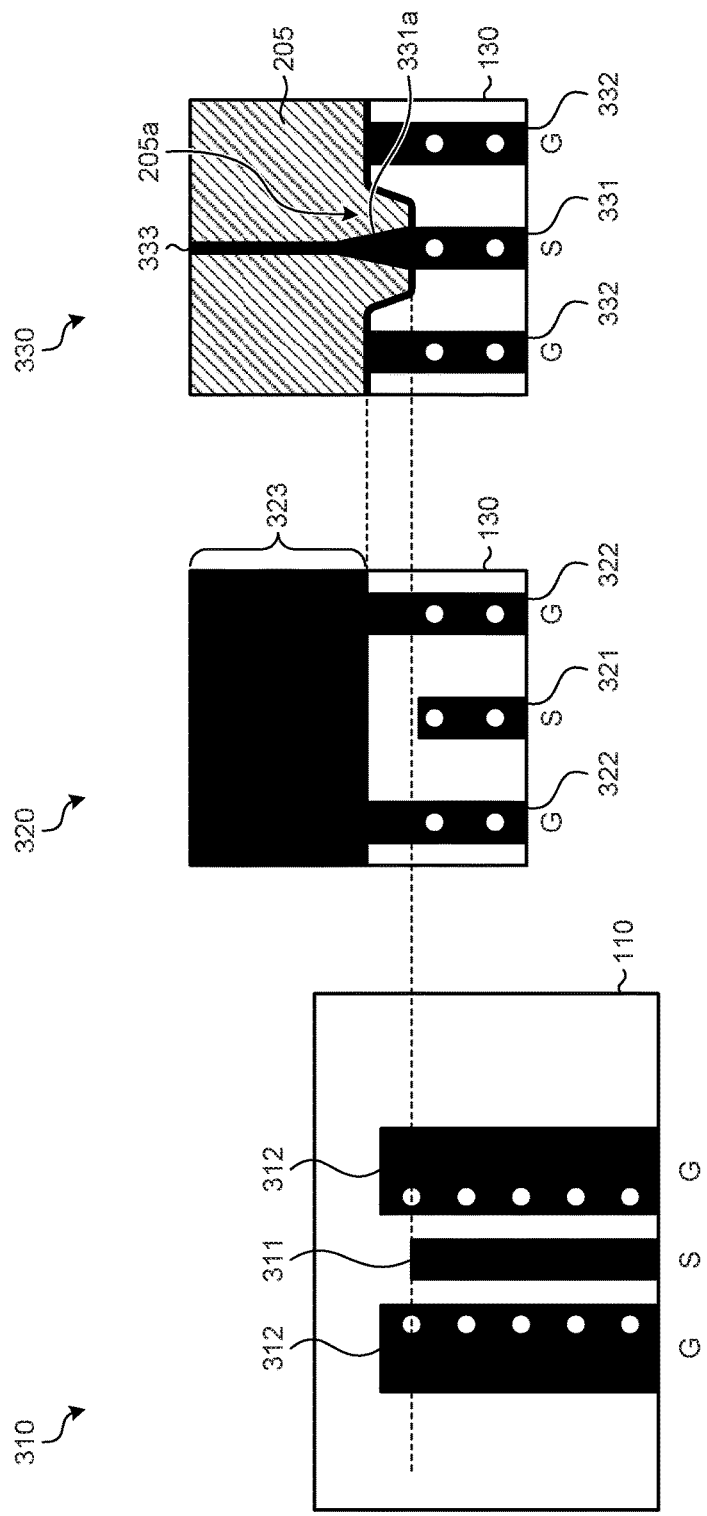
FIG. 3 is a diagram for explaining a shape of a coverlay according to the embodiment.

FIG. 3 is a diagram for explaining a shape of the coverlay 205 according to the embodiment. In FIG. 3, arrangement of electrodes on a surface 310 of the PCB 110, electrodes on a grounding surface 320 of the FPC 130, and electrodes on a signal surface 330 of the FPC 130 is illustrated. Specifically, electrodes 311 and 312 arranged on the surface 310 of the PCB 110 and pads 331 and 332 arranged on the signal surface 330 of the FPC 130 are soldered. Incidentally, in FIG. 3, "G" represents an electrode used for grounding (hereinafter, referred to as a grounding electrode) or a grounding pad, and "S" represents an electrode used for a signal (hereinafter, referred to as a signal electrode) or a signal pad. The coverlay 205 covers a portion where a microstripline 333 is arranged on the signal surface 330 of the FPC 130.

On the surface 310 of the PCB 110, the signal electrode 311 is printed and a pair of the grounding electrodes 312 are printed so as to sandwich the signal electrode 311. The grounding electrodes 312 may be connected to a layer of a grounding electrode provided inside the PCB 110 via through holes.

On the grounding surface 320 of the FPC 130, a signal pad 321 extending from an end to the center is arranged, and a pair of grounding pads 322 are arranged so as to sandwich the signal pad 321. The grounding pads 322 also extend from the end to the center of the grounding surface 320 of the FPC 130, and respective tips are connected to a grounding pattern 323.

On the signal surface 330 of the FPC 130, the signal pad 331 extending from an end to the center is arranged, and a pair of the grounding pads 332 are arranged so as to sandwich the signal pad 331. A tip of the signal pad 331 is connected to the microstripline 333. Furthermore, a connected portion 331a of the signal pad 331 connected to the microstripline 333 has a tapered shape so as to be tapered toward the microstripline 333.

The coverlay 205 is a reinforcing member produced by, for example, shaping polyimide resin or the like, and covers an area where the microstripline 333 is arranged on the signal surface 330 of the FPC 130. Specifically, the coverlay 205 covers an area from an end of the signal surface 330 on the optical modulator 120 side (an upper portion in FIG. 3) to the vicinities of tips of the grounding pads 332, and includes a protrusion 205a so as to cover the connected portion 331a in the vicinity of the signal pad 331. Specifically, the protrusion 205a protrudes from the vicinities of the tips of the grounding pads 332 toward the end of the FPC 130 on the PCB 110 side, and covers the connected portion 331a that is a part of the signal pad 331.

Because of the shape of the coverlay 205 as described above, even when a manufacturing error of the coverlay 205 is relatively large, the microstripline 333 and a thin portion at the tip of the connected portion 331a can reliably be covered by the coverlay 205. Therefore, it is possible to reinforce the vicinity of the connected portion 331a and reduce the possibility that the microstripline 333 is disconnected.

Furthermore, because of the shape of the coverlay 205 as described above, it is possible to solder the entire grounding pads 332 to the grounding electrodes 312 printed on the surface 310 of the PCB 110. Therefore, the entire grounding pads 332 are fixed to the PCB 110, and the vicinity of the connected portion 331a can hardly be bent even when the FPC 130 is bent. Consequently, a bending stress applied to the vicinity of the connected portion 331a is reduced, and it becomes possible to prevent a disconnection of the microstripline 333 in the vicinity of the connected portion 331a. Furthermore, because the connected portion 331a has a tapered shape, the stress is not concentrated on a single point, so that it is possible to further reduce the possibility that the microstripline 333 is disconnected.

The protrusion 205a is provided on the coverlay 205, and therefore, a portion of the signal pad 331 except for the connected portion 331a is soldered to the signal electrode 311 printed on the surface 310 of the PCB 110. Therefore, the position of a tip of the protrusion 205a and the position of the tip of the signal electrode 311 are approximately the same. In this case, the connected portion 331a is not soldered, and therefore, the characteristic impedance in this portion may be shifted from 50Ω and impedance mismatch may occur.

Figure 4:
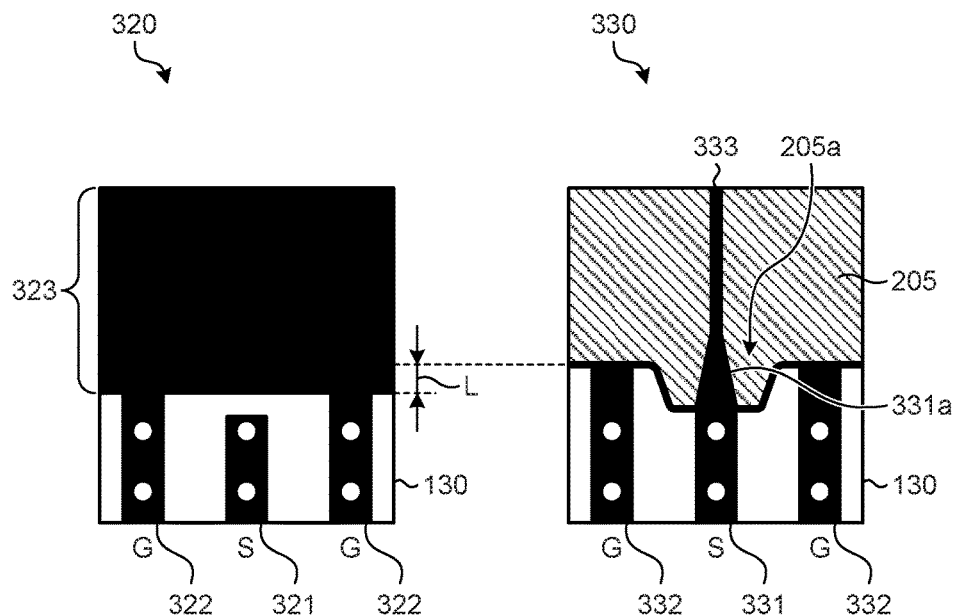
FIG. 4 is a diagram for explaining impedance adjustment.

To cope with this, as illustrated in FIG. 4, the size of the grounding pattern 323 is adjusted such that the electrodes at the grounding voltage are brought close to the connected portion 331a in order to ensure impedance matching. Incidentally, in FIG. 4, the same components as those illustrated in FIG. 3 are denoted by the same signs.

In FIG. 4, by adjusting an amount L of extension of the grounding pattern 323 extending toward the signal pad 321 relative to the position of the end of the coverlay 205 except for the protrusion 205a, it is possible to adjust the strength of electrical coupling between the connected portion 331a and the grounding pattern 323. Therefore, it is possible to adjust the characteristic impedance in the connected portion 331a to 50Ω and ensure impedance matching.

As described above, by providing the protrusion 205a on the coverlay 205, it is possible to cover a part of the signal pad 331 while not covering the grounding pads 332, reinforce the connected portion 331a, and ensure an adequately large area for soldering. Therefore, it is possible to protect the connected portion 331a in which a disconnection is likely to occur, and prevent a disconnection of the microstripline 333. Furthermore, by adjusting the size of the grounding pattern 323, it is possible to adjust the strength of the electrical coupling between the connected portion 331a and the grounding pattern 323 and ensure impedance matching. In other words, it is possible to maintain impedance matching and reinforce the wiring patterns on the flexible substrate.

Next, specific examples of the shape of each of the electrodes on the grounding surface 320 and the signal surface 330 of the FPC 130 will be described with reference to FIGS. 5 to 8. In FIGS. 5 to 8, the same components as those illustrated in FIG. 3 are denoted by the same signs.

Figure 5:
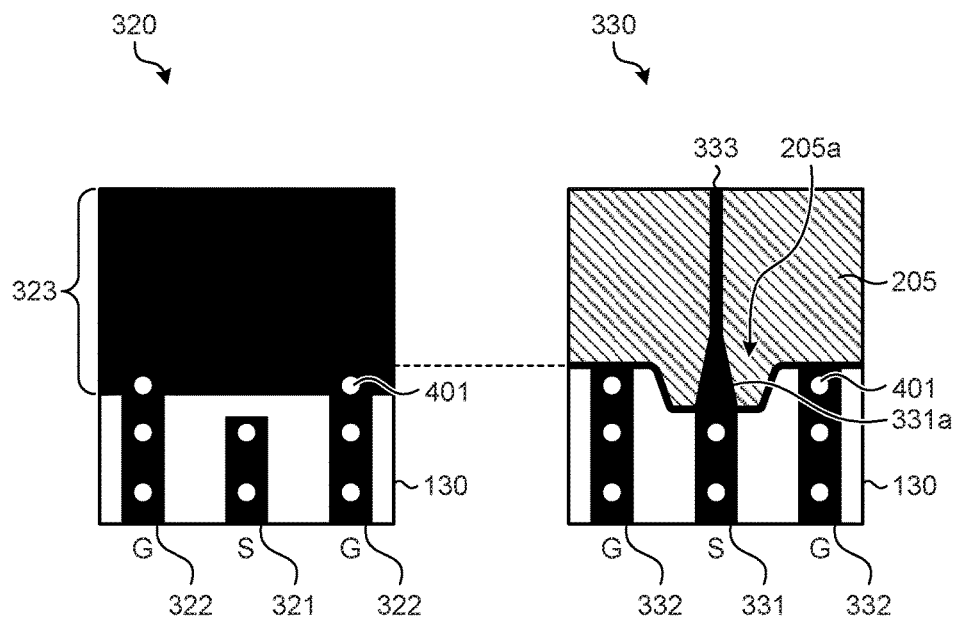
FIG. 5 is a diagram illustrating a specific example of electrodes in a connected portion of a PCB and an FPC.

First, as illustrated in FIG. 5, it may be possible to reinforce the vicinity of the connected portion 331a by providing through holes 401 at positions adjacent to the protrusion 205a on the grounding pads 322 and 332. Specifically, the through holes 401 are penetrating holes inside of which electrodes are attached, and the strength of the through holes 401 is increased by the internally-attached electrodes. Therefore, by providing the through holes 401 at the positions adjacent to the connected portion 331a, the vicinity of the connected portion 331a can be reinforced. Consequently, the vicinity of the connected portion 331a is less likely to bend when the FPC 130 is bent, so that it is possible to reduce the possibility of a disconnection of the microstripline 333.

Figure 6:
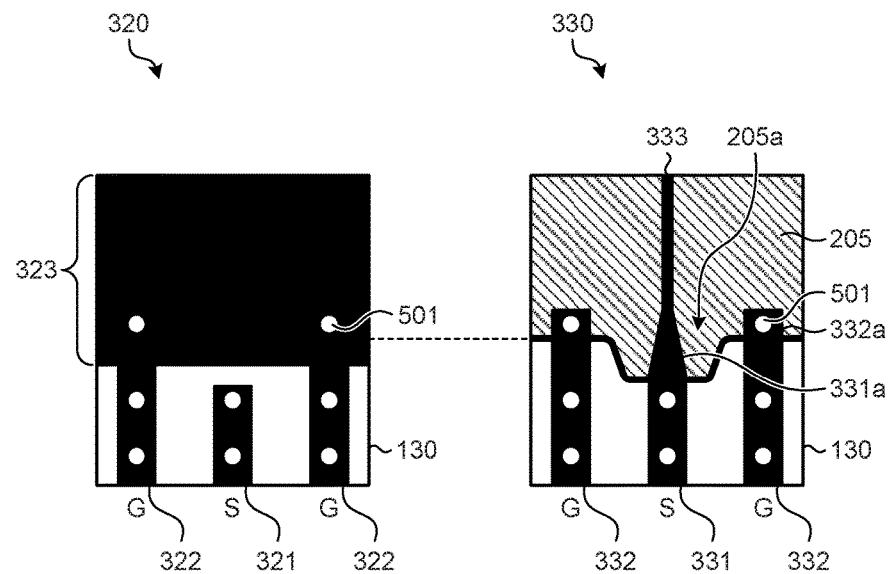
FIG. 6 is a diagram illustrating another specific example of the electrodes in the connected portion of the PCB and the FPC.

Similarly, as illustrated in FIG. 6, it may be possible to extend the grounding pads 332 such that extended portions 332a are covered by the coverlay 205, and provide through holes 501 on the extended portions 332a covered by the coverlay 205. Consequently, the thin portion at the tip of the connected portion 331a and the vicinity of one end portion of the microstripline 333 connected to the thin portion are less likely to bend, so that it is possible to further reduce the possibility of a disconnection of the microstripline 333.

Figure 7:
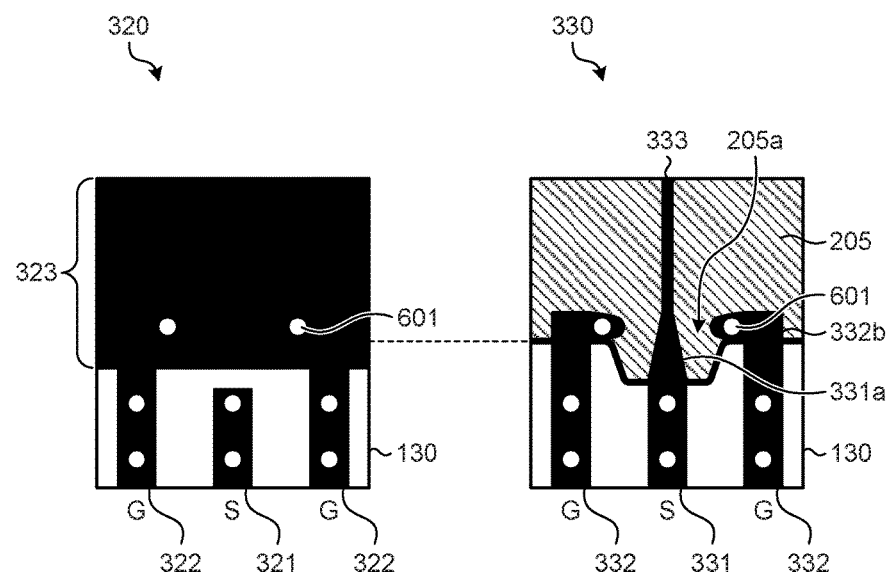
FIG. 7 is a diagram illustrating still another specific example of the electrodes in the connected portion of the PCB and the FPC.

Moreover, as illustrated in FIG. 7, it may be possible to modify the grounding pads 332 such that extended portions 332b of the grounding pads 332 covered by the coverlay 205 are brought close to the connected portion 331a. Consequently, it is possible to reduce gaps between the connected portion 331a and the extended portions 332b at the grounding voltage, and adjust the characteristic impedance in the connected portion 331a. In this case, by providing through holes 601 on the extended portions 332b, it is possible to reinforce the vicinity of the connected portion 331a similarly to FIGS. 5 and 6.

Figure 8:
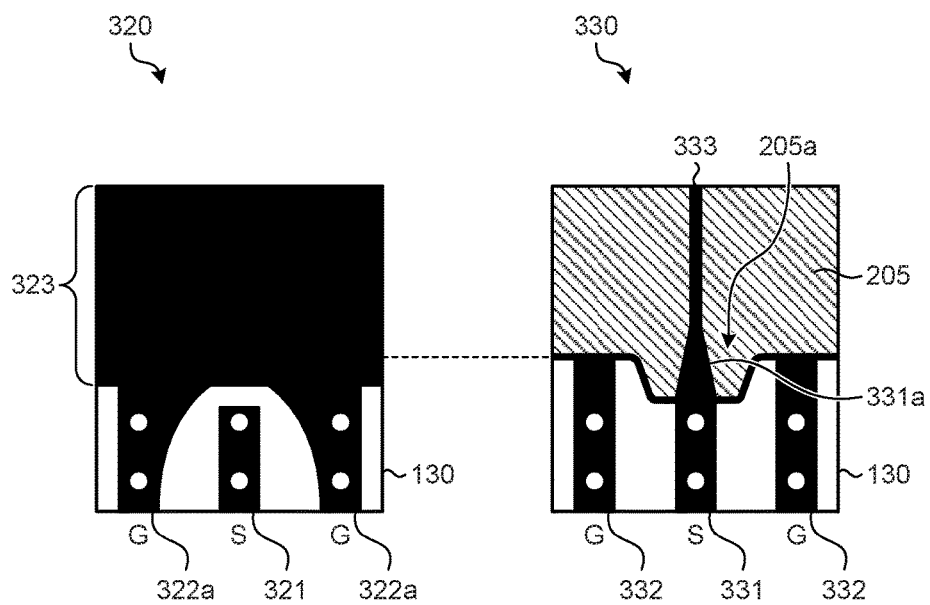
FIG. 8 is a diagram illustrating still another specific example of the electrodes in the connected portion of the PCB and the FPC.

Furthermore, as illustrated in FIG. 8, it may be possible to provide grounding pads 322a on the grounding surface 320 such that the widths of the grounding pads 322a are increased toward the grounding pattern 323 so as to be expanded to the signal pad 321 side. Consequently, gaps between the signal pad 321 and the grounding pads 322a are gradually reduced toward the grounding pattern 323, so that it is possible to reduce a portion where impedance is rapidly changed. This is done because, in the portion where impedance is rapidly changed, reflection of a microwave may occur and the quality of a high-frequency electrical signal to be transmitted may be reduced.

As described above, according to the embodiment, on the signal surface of the FPC, the protrusion provided on the coverlay covers the tapered connected portion of the signal pad and the microstripline. Furthermore, on the grounding surface of the FPC, the strength of the electrical coupling with the connected portion on the signal surface of the FPC is adjusted by adjusting the grounding pattern, to thereby adjust impedance. Therefore, it is possible to maintain impedance matching and, at the same time, solder the entire grounding pads to the electrodes on the surface of the PCB. Consequently, it is possible to reduce a bending stress applied to the connected portion and reduce the possibility of a disconnection of the microstripline. In other words, it is possible to maintain impedance matching and reinforce the wiring patterns on the flexible substrate.

In the above-described embodiment, it is assumed that the surface of the FPC 130 facing the PCB 110 serves as the signal surface and the surface away from the PCB 110 serves as the grounding surface; however, the signal surface and the grounding surface may inversely be related to each other. That is, the surface of the FPC 130 facing the PCB 110 may be used as the grounding surface including the grounding pattern and the like and the surface away from the PCB 110 may be used as the signal surface including the microstripline and the like. Even in this configuration, the coverlay including the protrusion on the signal surface can protect the connected portion of the signal pad and the microstripline even when a manufacturing error of the coverlay is large.

Furthermore, in the above-described embodiment, the connected portion of the signal pad and the microstripline are formed in the tapered shape; however, the connected portion need not necessarily be formed in the tapered shape. That is, a thin microstripline may directly be connected to a rectangular pad. Even in this configuration, the protrusion of the coverlay covers a part of the pad and the connected portion is reliably covered, so that it is possible to protect the connected portion.

Moreover, on the signal surface of the FPC, it may be possible to increase the sizes of the grounding pads relative to the signal pad in order to increase areas to be soldered to the electrodes on the surface of the PCB. In this configuration, it is possible to further increase the strength in the vicinity of the connected portion of the signal pad and the microstripline.

Figure 9:
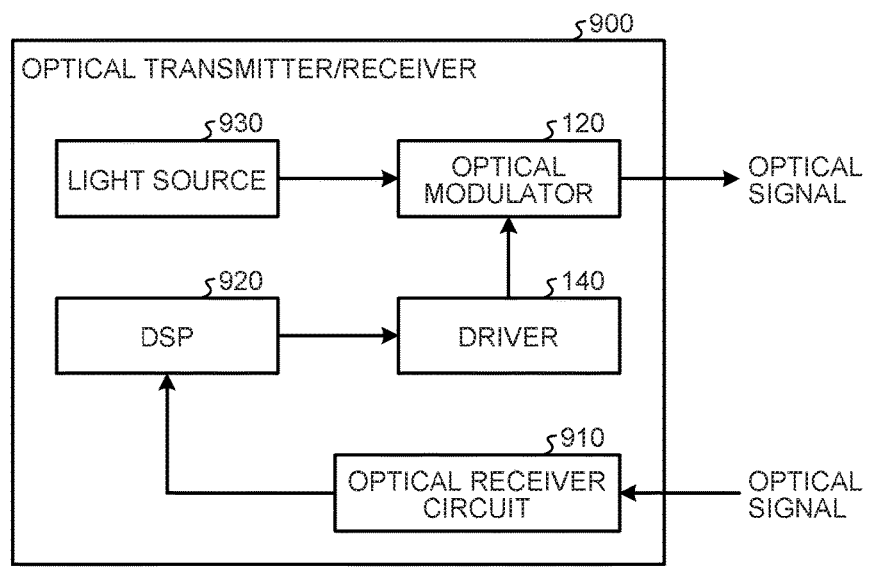
FIG. 9 is a block diagram illustrating a configuration example of an optical transmission/reception device.

Furthermore, the optical module according to the above-described embodiment may be applied to, for example, an optical transmission/reception device that transmits and receives an optical signal. FIG. 9 is a block diagram illustrating a configuration example of an optical transmitter/receiver 900 as the optical transmission/reception device. In FIG. 9, the same components as those illustrated in FIG. 1 are denoted by the same signs.

As illustrated in FIG. 9, the optical transmitter/receiver 900 includes an optical receiver circuit 910, a digital signal processor (DSP) 920, and a light source 930, in addition to the optical modulator 120 and the driver 140.

The optical receiver circuit 910 receives an optical signal, performs a predetermined light receiving process, such as photoelectric conversion, and outputs the obtained received signal to the DSP 920.

The DSP 920 performs various kinds of digital signal processing, such as digital demodulation or decoding, on a received signal output from the optical receiver circuit 910. Furthermore, the DSP 920 performs various kinds of digital signal processing, such as encoding or digital modulation, on transmission data, and outputs an obtained transmission signal to the driver 140. The transmission signal is converted, by the driver 140, to a high-frequency electrical signal for modulating light, and drives the optical modulator 120.

The light source 930 includes, for example, a light emitting diode (LED) or the like, and provides light to be subjected to optical modulation by the optical modulator 120. The light is subjected to optical modulation by the optical modulator 120 in accordance with the electrical signal output from the driver 140, and then transmitted as an optical signal.

In the optical transmitter/receiver 900 as described above, it may be possible to use the FPC 130 to connect the optical modulator 120 and the driver 140 as described in the above-described embodiment, and one of the surfaces of the FPC 130 is covered by the above-described coverlay 205. Furthermore, it may be possible to use the same flexible substrate as the FPC 130 to connect the DSP 920 and the driver 140 or to connect the optical receiver circuit 910 and the DSP 920. Even when the flexible substrates are used for the above-described connections, it is possible to maintain impedance matching and reinforce the wiring patterns on the flexible substrate by using the coverlay 205 of the above-described embodiment. Consequently, the transmission quality of the electrical signal is not reduced, an error rate of a received signal can be reduced, and the accuracy of an optical signal to be transmitted can be increased.

According to an embodiment of the optical module and the optical transmission/reception device of the disclosed technology, it is possible to maintain impedance matching and reinforce wiring patterns on a flexible substrate.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
    a substrate;
    an optical modulator arranged on the substrate; and
    a flexible substrate that has flexibility and electrically connects the substrate and the optical modulator, wherein
    the flexible substrate includes:
        a first pad for a signal that extends from an end of the flexible substrate on a side of the substrate to a center of the flexible substrate, and at least a part of which is fixed to the substrate;
        a pair of second pads for grounding that are arranged on both sides of the first pad to extend in parallel to the first pad, and at least a part of which is fixed to the substrate;
        a signal line that connects the first pad and the optical modulator and that is narrower in width than the first pad;
        a taper part that intervenes between the signal line and the first pad and that is tapered from the first pad toward the signal line; and
        a coverlay that covers the signal line and the taper part, wherein
    the coverlay includes:
        a wide part that covers the signal line and that has a width extending to outer edges of the pair of second pads in a width direction of the flexible substrate; and
        a protruding part that protrudes, at a position at which the first pad is arranged compared with a position at which the second pad is arranged, from the wide part toward the end of the flexible substrate on the side of the substrate to cover at least a part of the taper part.

2. The optical module according to claim 1, wherein
    the flexible substrate further includes a grounding pattern at a grounding voltage on a back side of an area where the signal line is arranged, and
    the grounding pattern is extended to a position close to an end of the flexible substrate on the substrate side relative to the area where the signal line is arranged.

3. The optical module according to claim 1, wherein the pair of second pads have a wider area than the first pad.

4. The optical module according to claim 1, wherein each of the pair of second pads includes a through hole that penetrates the flexible substrate at a position adjacent to the protruding part.

5. The optical module according to claim 1, wherein
    each of the pair of second pads includes an extended portion that extends to a position covered by the coverlay, and
    the extended portion includes a through hole that penetrates the flexible substrate.

6. The optical module according to claim 5, wherein the extended portion extends in a direction so as to come close to the first pad.

7. The optical module according to claim 1, further comprising:
    a third pad that is connected to one of the second pads via a through hole and that has a shape such that a width is increased from the end of the flexible substrate on the substrate side toward the center.

8. The optical module according to claim 1, wherein
    a portion of the first pad that is not covered by the protruding part is soldered to a signal electrode provided on the substrate, and
    the pair of second pads are soldered to a grounding electrode provided on the substrate.

9. An optical transmission/reception device comprising an optical module according to claim 1.

* * * * *